(12) United States Patent
Tsai

(10) Patent No.: US 12,088,485 B2
(45) Date of Patent: Sep. 10, 2024

(54) METHOD FOR TESTING CORE NETWORK FUNCTION ENTITY, TESTING DEVICE AND NON-TRANSITORY COMPUTER-READABLE MEDIUM

(71) Applicant: INSTITUTE FOR INFORMATION INDUSTRY, Taipei (TW)

(72) Inventor: Yi-Hsueh Tsai, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 374 days.

(21) Appl. No.: 17/455,411

(22) Filed: Nov. 17, 2021

(65) Prior Publication Data

US 2023/0124455 A1 Apr. 20, 2023

(30) Foreign Application Priority Data

Oct. 15, 2021 (TW) ................................. 110138430

(51) Int. Cl.
*H04L 43/0811* (2022.01)
*H04L 43/50* (2022.01)

(52) U.S. Cl.
CPC .......... *H04L 43/0811* (2013.01); *H04L 43/50* (2013.01)

(58) Field of Classification Search
CPC .............................. H04L 43/0811; H04L 43/50
See application file for complete search history.

(56) References Cited

U.S. PATENT DOCUMENTS

| | | | |
|---|---|---|---|
| 2007/0032228 A1* | 2/2007 | Varanda | G06F 11/0742 455/418 |
| 2009/0270098 A1 | 10/2009 | Gallagher et al. | |
| 2011/0145628 A1* | 6/2011 | Wilson | G06F 11/3692 714/37 |
| 2023/0040842 A1* | 2/2023 | Kita | G06F 9/50 |

OTHER PUBLICATIONS

The office action of the corresponding Taiwanese application No. TW110138430 issued on Mar. 21, 2022.
3GPP Draft, "3rd Generation Partnership Project; Technical Specification Group Services and System Aspects; 5G Security Assurance Specification (SCAS); Access and Mobility management Function (AMF) (Release 17)", Sep. 2021.
The office action of the corresponding Great Britain application No. GB2116936.2 issued on Jul. 19, 2022.

* cited by examiner

*Primary Examiner* — Kevin M Cunningham
(74) *Attorney, Agent, or Firm* — CKC & Partners Co., LLC

(57) ABSTRACT

A method for testing a core network function entity in a mobile communication system is disclosed. The method includes: performing a first test case on the core network function entity; and directly performing an integrated test with plural second test cases on the core network function entity without resetting the core network function entity in a condition where the core network function entity passes the first test case.

7 Claims, 9 Drawing Sheets

METHOD FOR TESTING CORE NETWORK FUNCTION ENTITY, TESTING DEVICE AND NON-TRANSITORY COMPUTER-READABLE MEDIUM

CROSS-REFERENCE TO RELATED APPLICATION

This application claims priority to Taiwan Application Serial Number 110138430, filed Oct. 15, 2021, which is herein incorporated by reference in its entirety.

BACKGROUND

Field of Invention

The present disclosure relates to core network functional testing, and more particularly to a method for testing a core network function entity, a testing device and a non-transitory computer-readable medium.

Description of Related Art

Security Assurance Specification (SCAS) is a network security test specification and evaluation mechanism specified by Third Generation Partnership Project (3GPP), which includes test specifications for core network functions. However, a network access test and reset of the core network function are required when performing each test case on the core network function, and thus a considerable amount of time to complete is needed for completing the overall test. In addition, if the core network function works abnormal, the test may not be smoothly completed, which is detrimental to fully automated testing.

SUMMARY

One aspect of the present disclosure is to provide a method for performing a core network functional test on a core network functional entity in a mobile communication system. The method includes: performing a first test case on the core network functional entity; and directly performing a batch test on the core network functional entity without resetting the core network functional entity without resetting the core network functional entity after the core network functional entity passes the first test case, in which the batch test comprises a plurality of second test cases.

In accordance with one or more embodiments of the present disclosure, the core network functional entity is an access and mobility function (AMF) entity.

In accordance with one or more embodiments of the present disclosure, the first test case is invalid or unacceptable user equipment (UE) security capabilities handling, non-access stratum (NAS) null integrity protection or response value (RES*) verification failure handling.

In accordance with one or more embodiments of the present disclosure, the second test cases comprises at least two of synchronization failure handling, NAS integrity algorithm selection and use, replay protection of NAS signalling messages, 5G-Global Unique Temporary Identity (GUTI) allocation, bidding down prevention and NAS protection algorithm selection in AMF change.

In accordance with one or more embodiments of the present disclosure, if the core network functional entity does not pass the first test case, the core network functional entity is reset and then the batch test is performed on the core network functional entity.

In accordance with one or more embodiments of the present disclosure, the method further includes performing a connectivity test on the core network functional entity to determine whether the core network functional entity is abnormal in response to expiration of a timer of the mobile communication system.

In accordance with one or more embodiments of the present disclosure, the connectivity test comprises a stream control transmission protocol (SCTP) connectivity test, a next generation application protocol (NGAP) connectivity test and an NAS connectivity test.

In accordance with one or more embodiments of the present disclosure, the timer is a timer of the core network functional entity or a timer of a mobile terminal communicatively connecting with the core network functional entity in the mobile communication system.

Another aspect of the present disclosure is to provide a test device for testing a core network functional entity in a mobile communication system. The test device includes a transceiver and a processor. The transceiver is configured to communicatively connect with the core network functional entity. The processor configured to perform message receptions and transmissions with the core network functional entity via the transceiver, perform a first test case on the core network functional entity, and directly perform a batch test on the core network functional entity without resetting the core network functional entity after the core network functional entity passes the first test case, in which the batch test comprises a plurality of second test cases.

Yet another aspect of the present disclosure is to provide a non-transitory computer readable medium storing computer program instructions that, when executed by a processor, cause the processor to perform the following operations: establishing a communicative connection with a core network functional entity in a mobile communication system via a transceiver; and transmitting and receiving messages with the core network functional entity via the transceiver, performing a first test case on the core network functional entity, and directing performing a batch test on the core network functional entity without resetting the core network functional entity after the core network functional entity passes the first test case, wherein the batch test comprises a plurality of second test cases.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
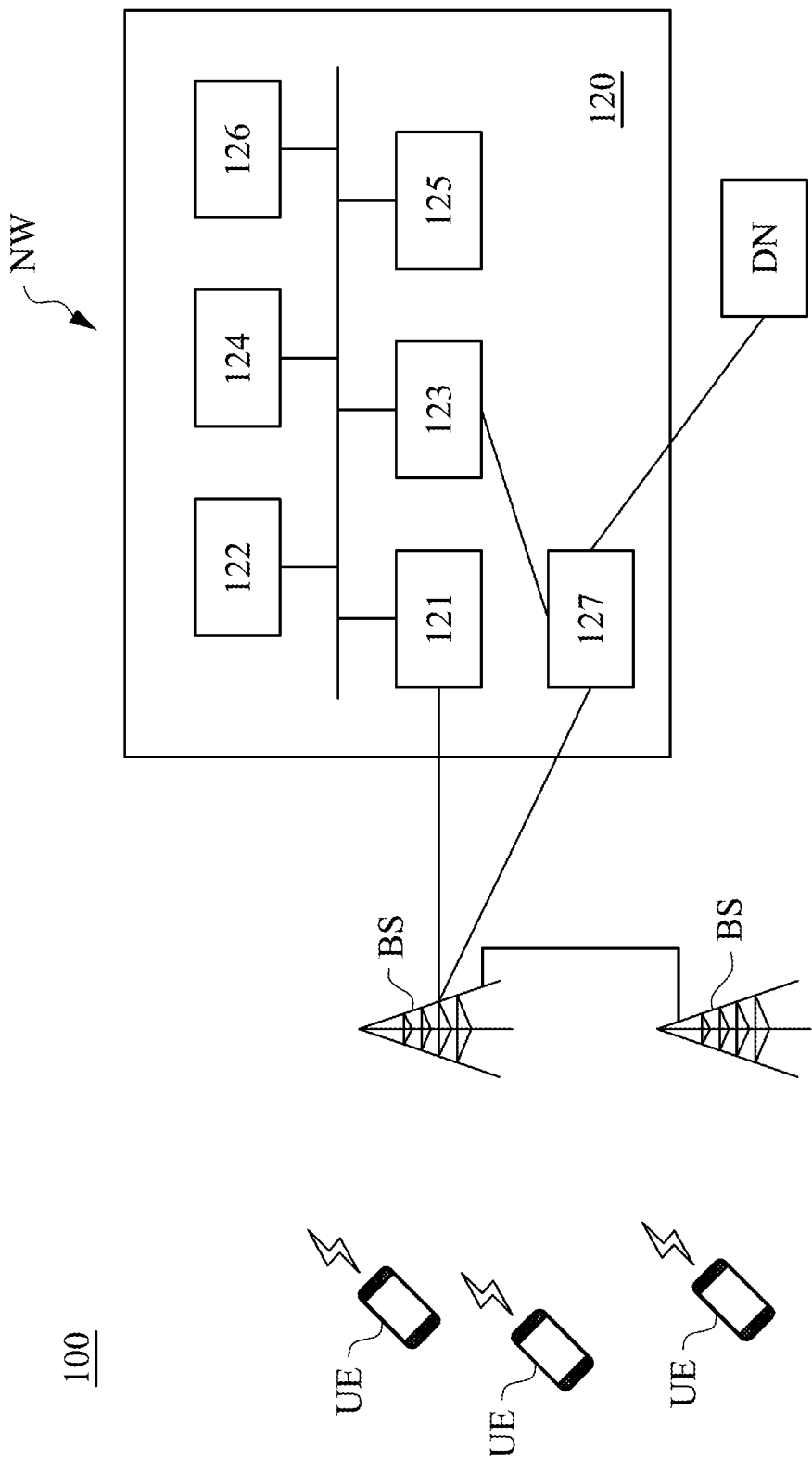
FIG. 1 is a schematic diagram of a mobile communication system.

Reference will now be made in detail to the present embodiments of the disclosure, examples of which are illustrated in the accompanying drawings. Wherever possible, the same reference numbers are used in the drawings and the description to refer to the same or like parts.

Terms used herein are used only to describe the specific embodiments, which are not used to limit the claims appended herewith. Unless limited otherwise, the term "a," "an," "one" or "the" of the single form may also represent the plural form.

The document may repeat reference numerals and/or letters in the various examples. This repetition is for the purpose of simplicity and clarity and does not in itself dictate a relationship between the various embodiments and/or configurations discussed.

FIG. 1 is a schematic diagram of a mobile communication system 100. In the mobile communication system 100, a mobile terminal UE connects to a network NW via a radio access network (RAN). The network NW includes a base station BS and a core network 120, in which the base station BS is configured to provide an interface for the mobile terminal UE to access the RAN, the core network 120 is configured to provide network services for the mobile terminal UE, and has core network functions. Taking fifth-generation (5G) mobile communication system for example, the core network functions may include at least Accessible and Mobility Function (AMF), Authentication Server Function (AUSF), Session Management Function (SMF), Unified Data Management (UDM), Policy and Control Function (PCF), Network Repository Function (NRF) and User Plane Function (UPF). The AMF is to perform identity verification, authorization and mobility management on the mobile terminal UE; the AUSF is to provide authentication services; the SMF is to manage sessions, allocate and manage an IP address of the mobile terminal UE and manage user plane session environment, the UDM is to manage data of the mobile terminal UE, including a user identifier, a credential, and so on; the PCF is to provide a service about mobility and session management policy control; the NRF is to support service repository functions; the UPF is to connect a RAN and a data network DN, and is responsible for routing user plane data packets. The core network functions of the core network 120 may be provided by various entities. For example, as shown in FIG. 1, the core network 120 includes functional entities 121-127 which are arranged for providing AMF, AUSF, SMF, UDM, PCF, NRF and UPF, respectively.

Figure 2:
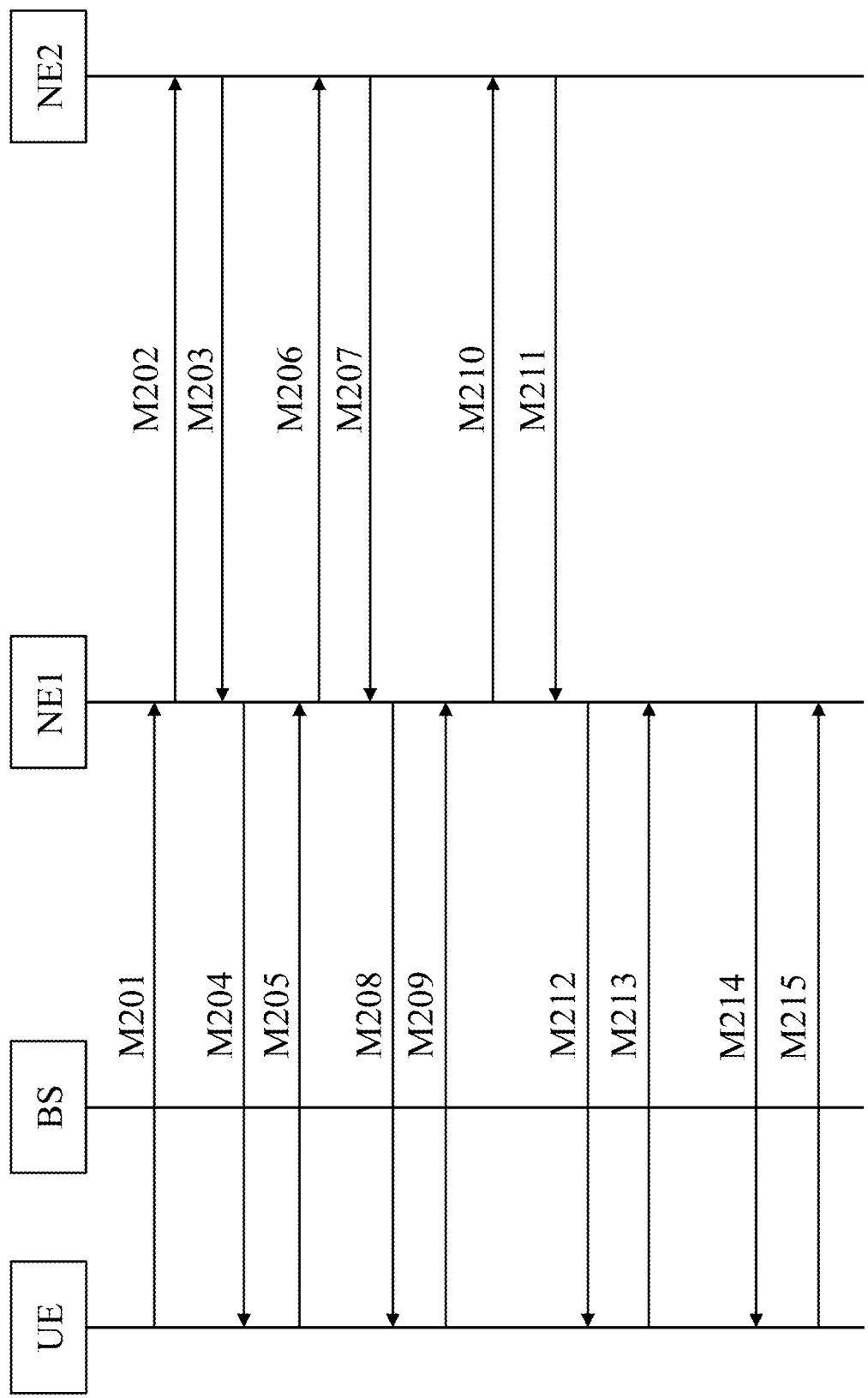
FIG. 2 is a message sequence chart of a synchronization failure handling testing procedure.

FIG. 2 is a message sequence chart of a synchronization failure handling testing procedure. First, the mobile terminal UE sends a registration request message M201 to the AMF entity NE1 in the core network. After receiving the registration request message M201, the AMF entity NE1 activates an authentication process and sends a user equipment authentication request message M202 to an AUSF entity NE2 in the core network. The AUSF entity NE2 sends a user equipment authentication response message M203 including an authentication context message to the AMF entity NE1. The AMF entity NE1 then sends an authentication request message M204 to the mobile terminal UE to forward the authentication context message. The mobile terminal UE sends an authentication failure message M205 including a synchronization failure indication message to the AMF entity NE1 due to synchronisation failure. After receiving the authentication failure message M205, the AMF entity NE1 reopens the authentication process and sends a user equipment authentication request message M206 to the AUSF entity NE2. The AUSF entity NE2 resends a user equipment authentication response message M207 including the authentication context message to the AMF entity NE1. The AMF entity NE1 then sends an authentication request message M208 to the mobile terminal UE to forward the authentication context message. Then, the mobile terminal UE calculates a response value, and sends an authentication response message M209 including the response value to the AMF entity NE1. Afterwards, the AMF entity NE1 performs an authentication process and sends a user equipment authentication request message M210 including the response value to the AUSF entity NE2. Then, in a condition where the authentication on the user equipment authentication request message M210 is successful, the AUSF entity NE2 sends a user equipment authentication response message M211 including an authentication success message to the AMF entity NE1. Afterwards, the AMF entity NE1 performs a security mode setup process and sends a security mode command message M212 to the mobile terminal UE, and then the mobile terminal UE sends a security mode complete message M213 to the AMF entity NE1. After receiving the security mode complete message M213, the AMF entity NE1 sends a registration accept message M214 to the mobile terminal UE, and then the mobile terminal UE sends a registration complete message M215 to the AMF entity NE1 in response to the registration accept message M214, so as to successfully complete the synchronization failure handling testing procedure.

Figure 3:
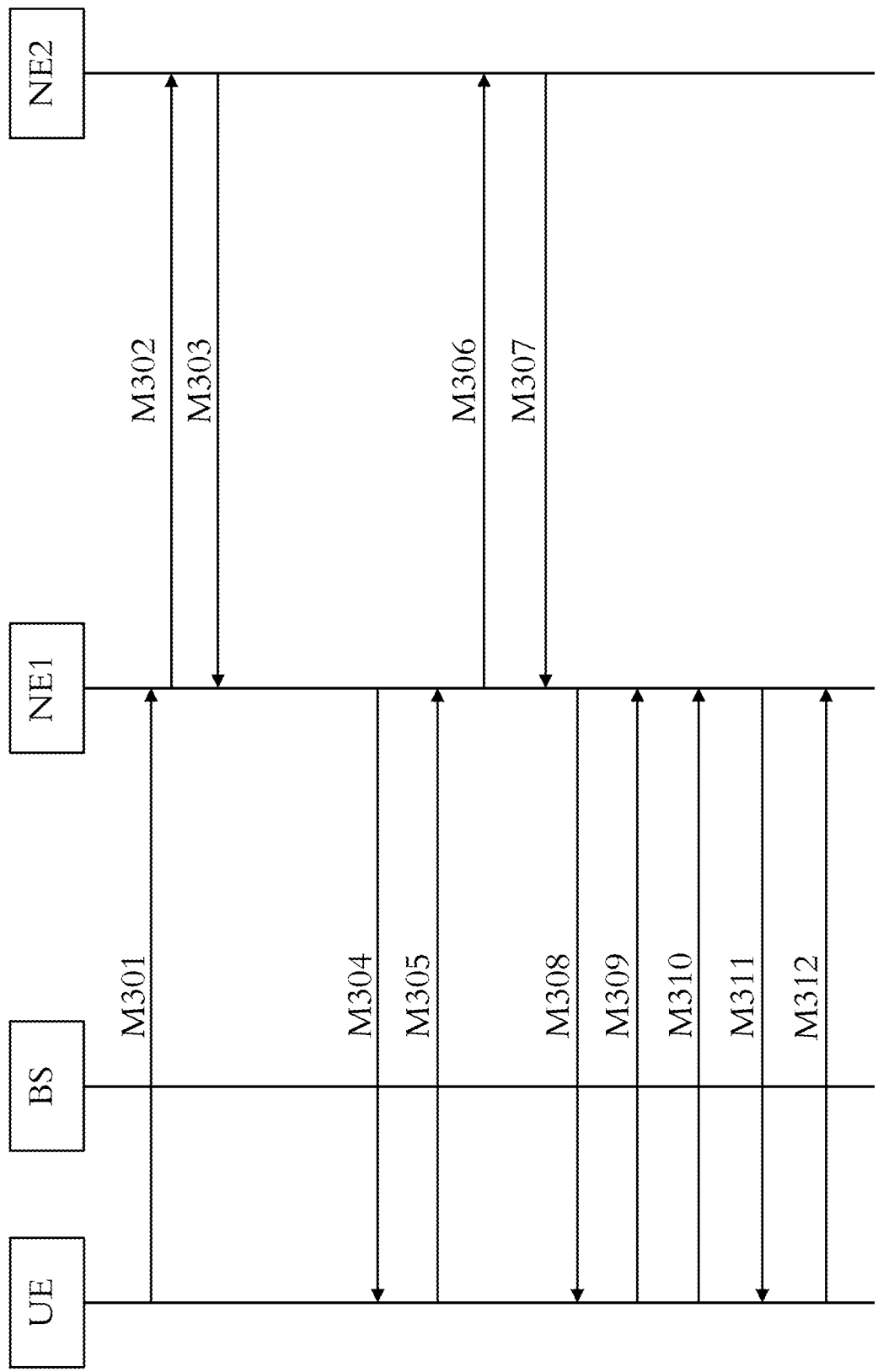
FIG. 3 is a message sequence chart of a replay protection of non-access stratum (NAS) signalling messages testing procedure.

FIG. 3 is a message sequence chart of a replay protection of non-access stratum (NAS) signalling messages testing procedure. First, the mobile terminal UE sends a registration request message M301 the AMF entity NE1 in the core network, and then the AMF entity NE1 sends a user equipment authentication request message M302 to the AUSF entity NE2 in the core network. The AUSF entity NE2 sends a user equipment authentication response message M303 including an authentication context message to the AMF entity NE1. The AMF entity NE1 sends an authentication request message M304 to the mobile terminal UE to forward the authentication context message. Then, the mobile terminal UE calculates a response value, and sends an authentication response message M305 including the response value the AMF entity NE1. Afterwards, the AMF entity NE1 performs an authentication process and sends a user equipment authentication request message M306 including the response value to the AUSF entity NE2. Afterwards, in a condition where the authentication on the user equipment authentication request message M306 is successful, the AUSF entity NE2 sends a user equipment authentication response message M307 including an authentication success message to the AMF entity NE1. Afterwards, the AMF entity NE1 performs a security mode setup process and sends a security mode command message M308 to the mobile terminal UE, then the mobile terminal UE sends a security mode complete message M309 to the AMF entity NE1, and then the mobile terminal UE sends a replay security mode complete message M310 to the AMF entity NE1. After receiving the replay security mode complete message M310, the AMF entity NE1 sends a registration accept message M311 to the mobile terminal UE, and then the mobile terminal UE sends a registration complete message M312 to the AMF entity NE1 in response to the registration accept message M311, so as to successfully complete the replay protection of NAS signalling messages testing procedure.

Figure 4:
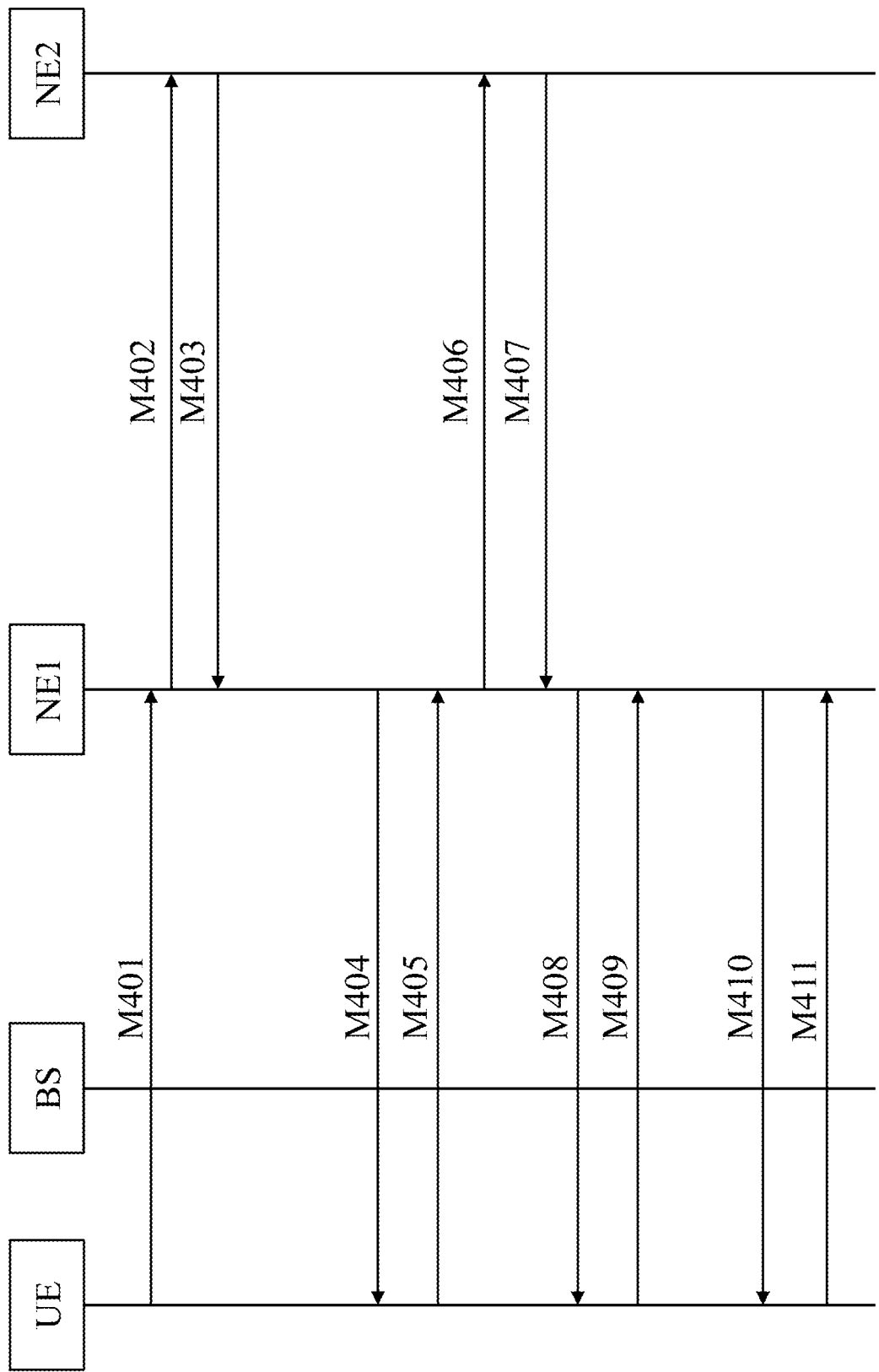
FIG. 4 is a message sequence chart of a NAS integrity algorithm selection and use testing procedure.

FIG. 4 is a message sequence chart of a NAS integrity algorithm selection and use testing procedure. First, the mobile terminal UE sends a registration request message M401 to the AMF entity NE1 in the core network, and then the AMF entity NE1 sends a user equipment authentication request message M402 to the AUSF entity NE2 in the core network CN. The AUSF entity NE2 sends a user equipment authentication response message M403 including an authentication context message to the AMF entity NE1. The AMF entity NE1 sends an authentication request message M404 to the mobile terminal UE to forward the authentication context message. Afterwards, the mobile terminal UE calculates a response value, and sends an authentication response message M405 including the response value to the AMF entity NE1. Then, the AMF entity NE1 performs an authentication process and sends a user equipment authentication request message M406 including the response value to the AUSF entity NE2. Afterwards, in a condition where the authentication on the equipment authentication request message M406, the AUSF entity NE2 sends a user equipment authentication response message M407 including an authentication success message to the AMF entity NE1. Afterwards, the AMF entity NE1 performs a security mode setup process and sends a security mode command message M408 to the mobile terminal UE, and then the mobile terminal UE sends a security mode complete message M409 to the AMF entity NE1. After receiving the security mode complete message M409, the AMF entity NE1 sends a registration accept message M410 to the mobile terminal UE, and then the mobile terminal UE sends a registration complete message M411 to the AMF entity NE1 in response to the registration accept message M410, so as to successfully complete the NAS integrity algorithm selection and use testing procedure.

As can be seen from the message sequence charts of FIGS. 2-4, the network access testing processes of the synchronization failure handling procedure, the replay protection of non-access stratum (NAS) signalling messages procedure and the NAS integrity algorithm selection and use procedure are the same, and therefore the network access testing process may be performed only at one time in these testing procedures. Specifically, the registration request messages M201, M301, M401 may be the same message, the user equipment authentication request messages M202, M302, M402 may be the same message, the user equipment authentication response messages M207, M303, M403 may be the same message, the authentication response message M209, M305, M405 may be the same message, the user equipment authentication request messages M210, M306, M406 may be the same message, the user equipment authentication response messages M211, M307, M407 may be the same message, and the security mode command messages M212, M308, M408 may be the same message. As a result, if the synchronization failure handling testing procedure, the replay protection of NAS signalling messages testing procedure and the NAS integrity algorithm selection and use testing procedure are integrated into a single testing procedure, then the same message may be sent only at one time without repetition, and the network access test may not be performed repeatedly.

Figure 5:
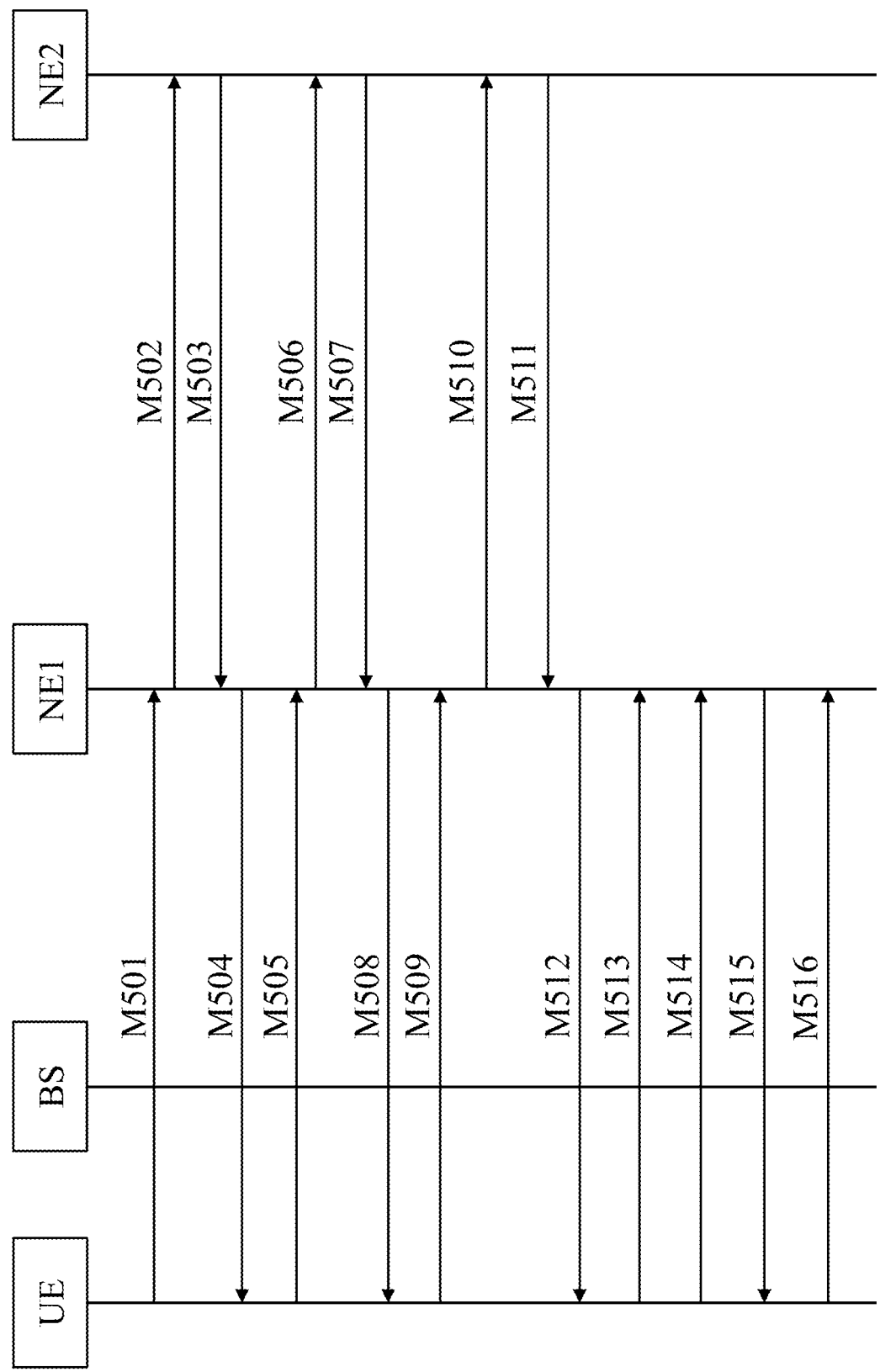
FIG. 5 is a message sequence chart of an integration of a synchronization failure handling testing procedure, a replay protection of NAS signalling messages testing procedure and a NAS integrity algorithm selection and use testing procedure.

FIG. 5 is a message sequence chart of an integration of a synchronization failure handling testing procedure, a replay protection of NAS signalling messages testing procedure and a NAS integrity algorithm selection and use testing procedure. First, the mobile terminal UE sends a registration request message M501 to the AMF entity NE1 in the core network. After receiving the registration request message M501, the AMF entity NE1 activates an authentication process and sends a user equipment authentication request message M502 to the AUSF entity NE2 in the core network. The AUSF entity NE2 sends a user equipment authentication response message M503 with an authentication and key agreement (AKA) message to the AMF entity NE1. The AMF entity NE1 then sends an authentication request message M504 to the mobile terminal UE to forward the AKA message. The mobile terminal UE sends an authentication failure message M505 including a synchronization failure indication message to the AMF entity NE1 due to synchronisation failure. After receiving the authentication failure message M505, the AMF entity NE1 reopens the authentication process and sends a user equipment authentication request message M506 to the AUSF entity NE2. The AUSF entity NE2 resends a user equipment authentication response message M507 including the AKA message to the AMF entity NE1. The AMF entity NE1 then sends an authentication request message M508 to the mobile terminal UE to forward the AKA message. Then, the mobile terminal UE calculates a response value, and sends an authentication response message M509 including the response value to the AMF entity NE1. Afterwards, the AMF entity NE1 performs an authentication process and sends a user equipment authentication request message M510 including the response value to the AUSF entity NE2. Then, in a condition where the authentication on the user equipment authentication request message M510 is successful, the AUSF entity NE2 sends a user equipment authentication response message M511 including an authentication success message to the AMF entity NE1. Afterwards, the AMF entity NE1 performs a security mode setup process and sends a security mode command message M512 to the mobile terminal UE, then the mobile terminal UE sends a security mode complete message M513 to the AMF entity NE1, and then the mobile terminal UE sends a replay security mode complete message M514 to the AMF entity NE1. After receiving the replay security mode complete message M514, the AMF entity NE1 sends a registration accept message M515 to the mobile terminal UE, and then the mobile terminal UE response a registration complete message M516 to the AMF entity NE1 in response to the registration accept message M515, so as to successfully complete the synchronization failure handling testing procedure the replay protection of NAS signalling messages testing procedure and the NAS integrity algorithm selection and use testing procedure.

Figure 6:
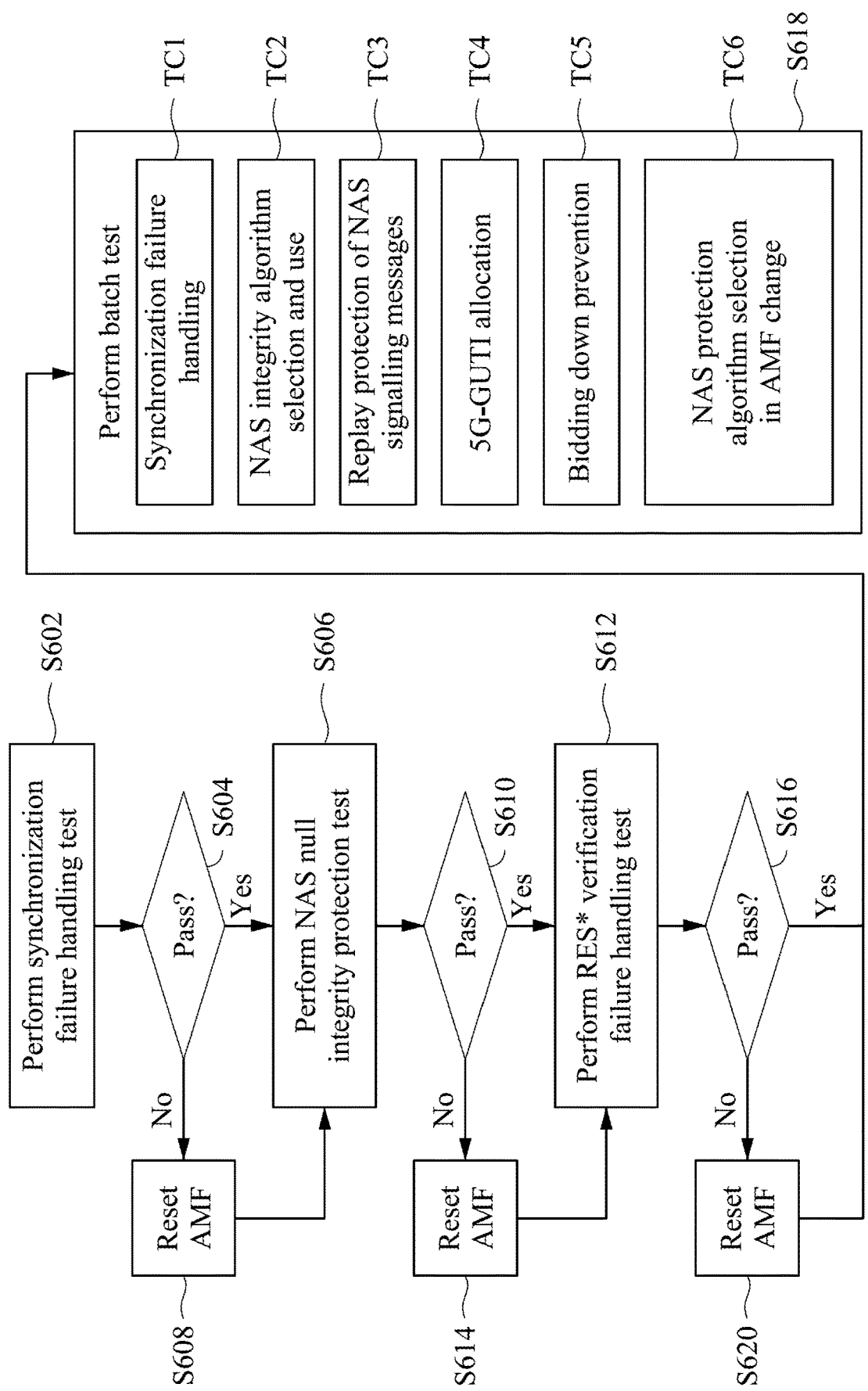
FIG. 6 is a flowchart of a core network functional test on AMF in accordance with some embodiments of the present disclosure.

FIG. 6 is a flowchart of a core network functional test on AMF in accordance with some embodiments of the present disclosure. First, in Step S602, a test case of invalid or unacceptable UE security capabilities handling is performed. After Step S602 is done, Step S604 is performed to determine whether the network entity passes the test case of invalid or unacceptable UE security capabilities handling. If yes, then the test proceeds to Step S606 to perform a test case of NAS null integrity protection; otherwise, Step S608 is performed to reset the AMF entity, and then Step S606 is performed.

After Step S606 is done, Step S610 is performed to determine whether the network entity passes the test case of NAS null integrity protection. If yes, then the test proceeds to Step S612 to perform a test case of response value (RES*) verification failure handling; otherwise, Step S614 is performed to reset the AMF entity, and then Step S612 is performed.

After Step S612 is done, Step S616 is performed to determine whether the network entity passes the test case of RES* verification failure handling. If yes, then Step S618 is performed to run a batch test; otherwise, Step S620 is performed to reset the AMF entity first, and then Step S618 is performed.

The batch test in Step S618 includes test cases TC1-TC6, in which the test case TC1 is synchronization failure handling, the test case TC2 is NAS integrity algorithm selection and use, the test case TC3 is replay protection of NAS signalling messages, the test case TC4 is 5G-GUTI allocation, the test case TC5 is bidding down prevention, and the test case TC6 is NAS protection algorithm selection in AMF change. In some embodiments, according to practical requirements, the batch test in Step S618 may be modified to include only a part of the test cases TC1-TC6.

For the test cases of invalid or unacceptable UE security capabilities handling, NAS null integrity protection and RES* verification failure handling, if the current test case is passed, the test procedure may directly proceeds to the next test case without resetting the AMF entity; otherwise, the AMF entity has to be reset before the next test case is performed.

In addition, for the test cases of synchronization failure handling, non-access stratum (NAS) integrity algorithm selection and use, replay protection of NAS signalling messages, 5G-Global Unique Temporary Identity (GUTI) allocation, bidding down prevention and NAS protection algorithm selection in AMF change, the AMF entity needs to be reset to clean the mobile terminal verification information temporarily stored in the AMF entity regardless of whether the test is passed, so as to avoid affecting the subsequent tests and assure that the test procedure is normal. Therefore, by integrating the test cases of synchronization failure handling, non-access stratum (NAS) integrity algorithm selection and use, replay protection of NAS signalling messages, 5G-Global Unique Temporary Identity (GUTI) allocation, bidding down prevention and NAS protection algorithm selection in AMF change into a single test procedure, during the integrated test procedure, the network assess test needs to be performed only at one time, and the AMF entity does not need to be reset. Furthermore, by arranging the batch test later than the test cases of invalid or unacceptable UE security capabilities handling, NAS null integrity protection and RES* verification failure handling, the AMF entity does not have to be reset in a condition where the test cases of invalid or unacceptable UE security capabilities handling, NAS null integrity protection and RES* verification failure handling are all passed, so as to accelerate completing all test cases for the AMF entity.

Figure 7:
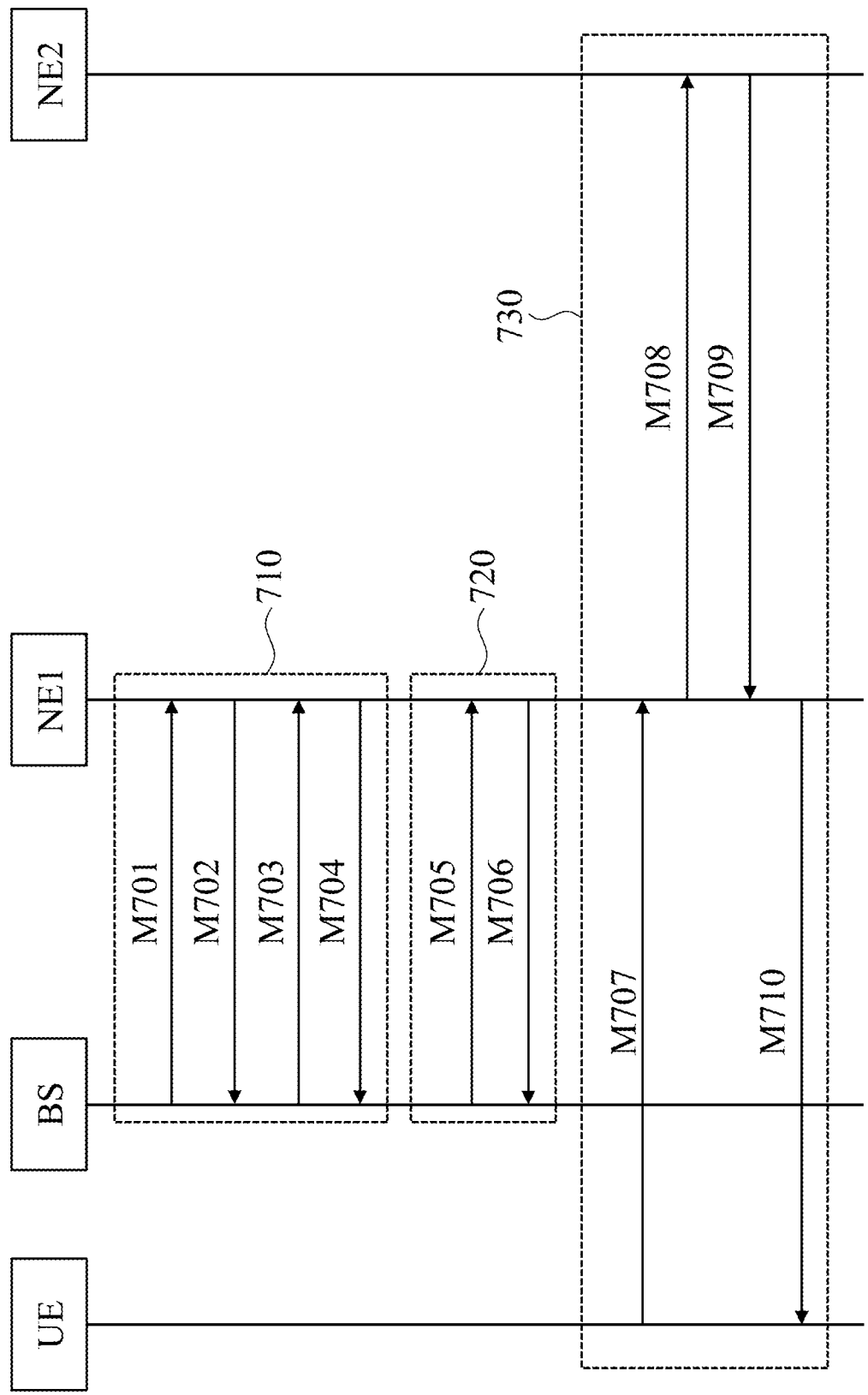
FIG. 7 is a message sequence chart of a connectivity test due to timeout of a timer in testing the AMF entity in accordance with some embodiments of the present disclosure.

However, the test on the AMF entity would not be successfully completed if the AMF entity works abnormal. In view of this situation, the present disclosure further provides an abnormal detection mechanism for the AMF entity. FIG. 7 is a message sequence chart of a connectivity test due to timeout of a timer in testing the AMF entity in accordance with some embodiments of the present disclosure. The timer may be that of the mobile device or the AMF entity. As shown in FIG. 7, the connectivity test includes a Stream Control Transmission Protocol (SCTP) connectivity test 710, a Next Generation Application Protocol (NGAP) connectivity test 720 and a NAS protocol connectivity test 730.

During the SCTP connectivity test 710, the base station and the AMF entity perform 4-way handshake. First, the base station sends an initial message M701 to the AMF entity, and then the AMF entity responds to the base station with an initial acknowledge message M702. After receiving the initial acknowledge message M702, the base station sends a cookie echo message M703 to the AMF entity, and then the AMF entity responds to the base station with a cookie acknowledge message M704 to finish the 4-way handshake, so as to confirm that the SCTP connectivity is normal.

During the NGAP connectivity test 720, the base station sends a setup request message M705 to the AMF entity, and then the AMF entity responds to the base station with a setup response message M706, so as to confirm that the NGAP connectivity is normal.

During the NAS protocol test 730, the user equipment sends a registration request message M707 to the AMF entity, and then the AMF entity sends a user equipment authentication request message M708 to the AUSF entity. After receiving the user equipment authentication request message M708, the AUSF entity responds to the AMF entity with a user equipment authentication response message M709, and the AMF entity responds to the base station with a registration reject message M710, so as to confirm that the NAS protocol connection is normal.

Figure 8:
FIG. 8 is a flowchart of a connectivity testing on the AMF entity in accordance with some embodiments of the present disclosure.

FIG. 8 is a flowchart of a connectivity testing on the AMF entity in accordance with some embodiments of the present disclosure. The connectivity test shown in FIG. 8 may be performed in a condition where a timer of the AMF entity is timeout. First, Step S802 is performed to test an SCTP connectivity of the AMF entity, such as the SCTP connectivity test 710 shown in FIG. 7, and then Step S804 is performed to confirm whether the SCTP connectivity test is successful. If yes, then Step S806 is performed to test an NGAP connectivity on the AMF entity, such as the NGAP connectivity test 720 shown in FIG. 7; otherwise, Step S808 is performed to determine that the AMF entity is abnormal. Step S810 is performed to confirm whether the NGAP connectivity test is successful. If yes, then Step S812 is performed to test the NAS protocol connectivity of the AMF entity, such as the NAS protocol connectivity test 730 shown in FIG. 7; otherwise, Step S808 is performed to determine that the AMF entity is abnormal. Step S814 is to confirm whether the NAS protocol connectivity test is successful. If yes, then Step S816 is performed to determine that the AMF entity is normal; otherwise, Step S808 is performed to determine that the AMF entity is abnormal. In a condition where the AMF entity is determined as normal, a connectivity test normal message may be reported and/or stored, or alternatively the incomplete test cases may be resumed. Oppositely, in a condition where the AMF entity is determined as abnormal, an error message may be reported and/or stored to notify an operator for debugging, or alternatively the AMF entity may be reset directly for resuming the incomplete test cases.

Figure 9:
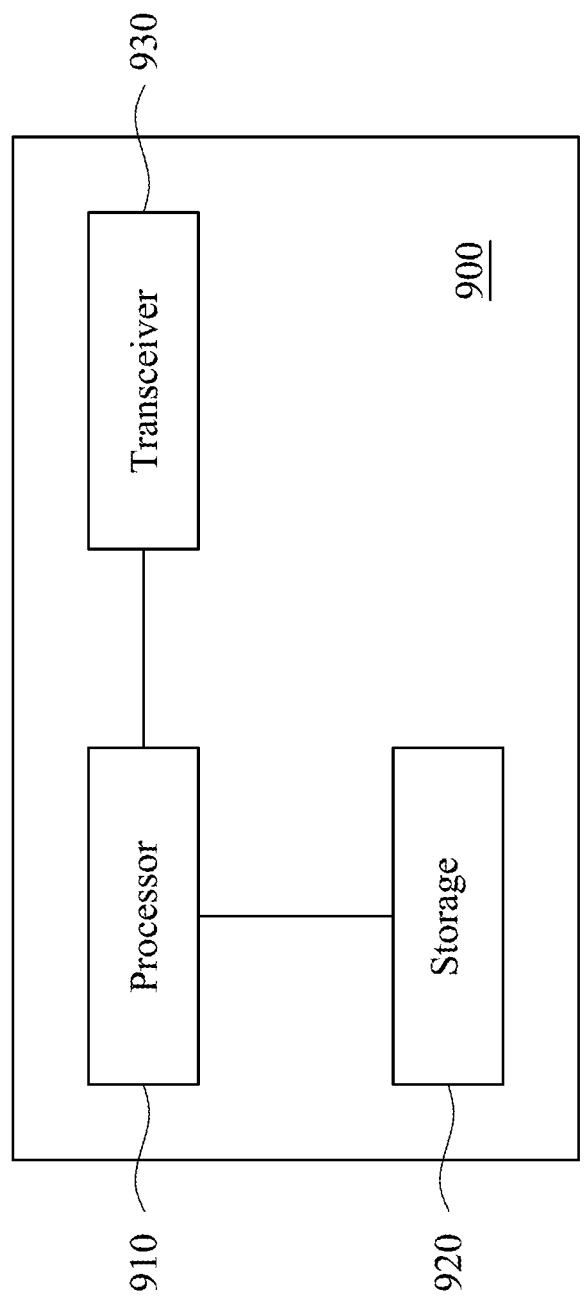
FIG. 9 is a schematic diagram of a test device in accordance with some embodiments of the present disclosure.

FIG. 9 is a schematic diagram of a test device 900 in accordance with some embodiments of the present disclosure. The test device 900 may simulate a mobile terminal, a base station and AUSF of a core network, and may be configured to verify whether a core network functional entity can pass test cases. The test device 900 includes a processor 910, a storage 920 and a transceiver 930. The processor 910 may be a single-core or a multi-core processor, a microprocessor, a digital signal processor (DSP) or another suitable processing circuit. When the test device 900 communicatively connects the core network functional entity, the processor 910 may perform the core network functional test shown in FIG. 6 and/or the connectivity test shown in FIG. 8 on the core network functional entity by reading and executing the program codes stored in the storage 920. The storage 920 may be any data storage device, and may be accessed by the processor 910. The storage 920 may be a read-only memory (ROM), an erasable programmable read-only memory (EPROM), an electrically erasable programmable read-only memory (EEPROM), a CD-ROM, a magnetic tape, a hard disk drive, a solid-state drive (SSD), a flash memory or another non-transitory computer readable medium suitable for storing program codes. The transceiver 930 may be a wired and/or wireless transceiver, and is configured to communicatively connect the core network functional entity, such that the processor 910 may perform message transmissions and receptions with the core network functional entity via the transceiver 930.

In the present disclosure, the test cases of invalid or unacceptable UE security capabilities handling, NAS null integrity protection, response value verification failure handling, synchronization failure handling, NAS integrity algorithm selection and use, replay protection of NAS signalling messages, 5G-GUTI allocation, bidding down prevention and NAS protection algorithm selection in AMF change may be those specified in the Third Generation Partnership Project (3GPP) test specification TS 33.512. In addition, the initial message, the initial acknowledge message, the cookie echo message and the cookie acknowledge message may be the SCTP INIT message, the SCTP INIT ACK message, the SCTP COOKIE ECHO message and the SCTP COOKIE ACK message specified in the SCTP standard, respectively. The setup request message and the setup response message may be the NGAP SETUP REQUEST message and the NGAP SETUP RESPONSE message specified in the NGAP standard, respectively. The registration request message, the registration accept message, the registration complete message, the authentication request message, the authentication failure message, the authentication response message, the security mode command message, the security mode complete message and the replay security mode complete message may be the Registration Request message, the Registration Accept message, the Registration Complete message, the Authentication Request message, the Authentication Failure message, the Authentication Response message, the Security Mode Command message, the Security Mode Complete message and the Replay Security Mode Complete message specified in the 3GPP specifications. The user equipment authentication response including the authentication context message may be the Nausf_UEAuthentication_Authenticate Response message with a Hypertext Transfer Protocol (HTTP) status code of 201 Created specified in the 3GPP specifications, the user equipment authentication response including the authentication success message may be the Nausf_UEAuthentication_Authenticate Response message with an HTTP status code of 200 OK specified in the 3GPP specifications, the user equipment authentication response including the authentication reject message may be the Nausf_UEAuthentication_Authenticate Response message with an HTTP status code of 404 Not Found specified in the 3GPP specifications. The timer of the mobile device may be the T3510 timer or the T3516 timer specified in the 3GPP specifications, and the timer of the AMF entity may be the T3550 timer or the T3560 timer specified in the 3GPP specifications.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for performing a core network functional test on a core network functional entity in a mobile communication system, comprising:
    performing a first test case on the core network functional entity;
    performing a batch test on the core network functional entity when the core network functional entity passes the first test case;
    resetting the core network functional entity and then performing the batch test on the core network functional entity when the core network functional entity does not pass the first test case, wherein the batch test comprises a plurality of second test cases;
    resetting, after the batch test is performed, the core network functional entity whether the core network functional entity passes the second test cases or not; and
    performing a connectivity test on the core network functional entity to determine whether the core network functional entity is abnormal in response to expiration of a timer of the mobile communication system;
    wherein the connectivity test comprises a stream control transmission protocol (SCTP) connectivity test, a next generation application protocol (NGAP) connectivity test and an NAS connectivity test.

2. The method of claim 1, wherein the core network functional entity is an access and mobility function (AMF) entity.

3. The method of claim 1, wherein the first test case is invalid or unacceptable user equipment (UE) security capabilities handling, non-access stratum (NAS) null integrity protection or response value (RES*) verification failure handling.

4. The method of claim 1, wherein the second test cases comprises at least two of synchronization failure handling, NAS integrity algorithm selection and use, replay protection of NAS signalling messages, 5G-Global Unique Temporary Identity (GUTI) allocation, bidding down prevention and NAS protection algorithm selection in AMF change.

5. The method of claim 1, wherein the timer is a timer of the core network functional entity or a timer of a mobile terminal communicatively connecting with the core network functional entity in the mobile communication system.

6. A test device for testing a core network functional entity in a mobile communication system, the test device comprising:
    a transceiver configured to communicatively connect with the core network functional entity; and
    a processor configured to perform message receptions and transmissions with the core network functional entity via the transceiver, configured to perform a first test case on the core network functional entity, configured to perform a batch test on the core network functional entity when the core network functional entity passes the first test case, and configured to reset the core network functional entity and then perform the batch test on the core network functional entity when the core network functional entity does not pass the first test case, wherein the batch test comprises a plurality of second test cases, and configured to reset, after the batch test is performed, the core network functional entity whether the core network functional entity passes the second test cases or not;

wherein the processor is further configured to perform a connectivity test on the core network functional entity to determine whether the core network functional entity is abnormal in response to expiration of a timer of the mobile communication system;

wherein the connectivity test comprises a stream control transmission protocol (SCTP) connectivity test, a next generation application protocol (NGAP) connectivity test and an NAS connectivity test.

7. A non-transitory computer readable medium storing computer program instructions that, when executed by a processor, cause the processor to perform the following operations:

establishing a communicative connection with a core network functional entity in a mobile communication system via a transceiver;

transmitting and receiving messages with the core network functional entity via the transceiver, performing a first test case on the core network functional entity, performing a batch test on the core network functional entity when the core network functional entity passes the first test case, resetting the core network functional entity and then performing the batch test on the core network functional entity when the core network functional entity does not pass the first test case, wherein the batch test comprises a plurality of second test cases, and resetting, after the batch test is performed, the core network functional entity whether the core network functional entity passes the second test cases or not; and performing a connectivity test on the core network functional entity to determine whether the core network functional entity is abnormal in response to expiration of a timer of the mobile communication system;

wherein the connectivity test comprises a stream control transmission protocol (SCTP) connectivity test, a next generation application protocol (NGAP) connectivity test and an NAS connectivity test.

\* \* \* \* \*